(12) United States Patent
Hutchinson et al.

(10) Patent No.: US 11,042,962 B2
(45) Date of Patent: Jun. 22, 2021

(54) HARDWARE OPTIMISATION FOR GENERATING 360° IMAGES

(71) Applicant: Avago Technologies International Sales Pte. Limited, Singapore (SG)

(72) Inventors: James Hutchinson, Cambridge (GB); Thomas Oscar Miller, Cambridge (GB); Stephen John Barlow, Cambridge (GB); Jack Stuart Haughton, Cambridge (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/094,438

(22) PCT Filed: Apr. 18, 2017

(86) PCT No.: PCT/GB2017/051071
§ 371 (c)(1),
(2) Date: Oct. 17, 2018

(87) PCT Pub. No.: WO2017/182790
PCT Pub. Date: Oct. 26, 2017

(65) Prior Publication Data
US 2019/0385277 A1    Dec. 19, 2019

(30) Foreign Application Priority Data
Apr. 18, 2016  (GB) .................................... 1606745

(51) Int. Cl.
*H04N 5/262*  (2006.01)
*G06T 3/40*  (2006.01)
(Continued)

(52) U.S. Cl.
CPC .............. *G06T 3/4038* (2013.01); *G06T 1/60* (2013.01); *G06T 3/0018* (2013.01);
(Continued)

(58) Field of Classification Search
CPC ........ G06T 3/4038; G06T 2207/20221; H04N 19/597; H04N 19/80
(Continued)

(56) References Cited

U.S. PATENT DOCUMENTS 5,204,916 A    4/1993  Hamilton et al.
6,141,034 A    10/2000 McCutchen
(Continued)

FOREIGN PATENT DOCUMENTS

EP    1028389    8/2000
EP    2637138    9/2013
(Continued)

OTHER PUBLICATIONS

Great Britain Search Report in Great Britain Application No. GB1706118.5, dated Oct. 16, 2017, 4 pages.
(Continued)

*Primary Examiner* — John W Miller
*Assistant Examiner* — Jean W Desir
(74) *Attorney, Agent, or Firm* — Morgan, Lewis & Bockius LLP (57) ABSTRACT

An apparatus for filtering multiple images so that they can be stitched together to form a blended image, the apparatus comprising a plurality of filters configured such that: (i) each filter is configured to process only images from the multiple images that will be non-overlapping with each other in the blended image; and (ii) images that will overlap with each other in the blended image are processed by different filters.

19 Claims, 7 Drawing Sheets

(51) Int. Cl.
*G06T 7/33* (2017.01)
*G06T 1/60* (2006.01)
*G06T 3/00* (2006.01)
*G06T 15/04* (2011.01)
*H04N 5/232* (2006.01)

(52) U.S. Cl.
CPC .............. *G06T 3/0062* (2013.01); *G06T 7/33* (2017.01); *G06T 15/04* (2013.01); *H04N 5/23238* (2013.01); *G06T 2207/20221* (2013.01)

(58) Field of Classification Search
USPC ....... 348/36, 38, 64, 584, 598; 382/284, 260
See application file for complete search history.

(56) References Cited

U.S. PATENT DOCUMENTS

| | | | |
|---|---|---|---|
| 6,549,210 B1 | 4/2003 | Van Hook et al. | |
| 6,754,374 B1 | 6/2004 | Miller | |
| 8,933,985 B1 | 1/2015 | Rapaport et al. | |
| 2002/0057361 A1 | 5/2002 | Mayer et al. | |
| 2003/0095338 A1 | 5/2003 | Singh et al. | |
| 2009/0028397 A1 | 1/2009 | Makram-Ebeid | |
| 2011/0037771 A1* | 2/2011 | Kurupati | G06T 5/20 345/536 |
| 2014/0028694 A1 | 1/2014 | Wang et al. | |
| 2014/0368513 A1 | 1/2014 | Lyashevsky et al. | |
| 2015/0009359 A1 | 1/2015 | Zaheer et al. | |
| 2016/0094859 A1* | 3/2016 | Tourapis | H04N 19/44 348/43 |
| 2016/0259023 A1 | 9/2016 | Overall et al. | |

FOREIGN PATENT DOCUMENTS

| | | |
|---|---|---|
| WO | WO 2006/019374 | 2/2006 |
| WO | WO 2013/109742 | 7/2013 |

OTHER PUBLICATIONS

Great Britain Search Report in Great Britain Application No. GB1706118.5, dated Sep. 10, 2018, 2 pages.
International Search Report and Written Opinion in International Application No. PCT/GB2017/051071, dated Sep. 25, 2017, 18 pages.
Popovic Vladan et al., "Reconfigurable forward homography estimation system for real-rime applications," 2014 22nd International Conference on Very Large Scale Integration(VLSI-SOC), Carmen, Mexico, Oct. 6-8, 2014, IEEE, 6 pages, XP032716846.

* cited by examiner

HARDWARE OPTIMISATION FOR GENERATING 360° IMAGES

CROSS-REFERENCE TO RELATED APPLICATIONS

This application is a national stage of and claims priority under 35 U.S.C. § 371 to PCT Application No. PCT/GB2017/051071, filed on Apr. 18, 2017, which claims priority to Great Britain Application No. GB 1606745.6, filed on Apr. 18, 2016. The contents of both of these priority applications are hereby incorporated by reference in their entirety.

This invention relates to methods and apparatus for stitching together multiple images.

A "normal" camera lens is one that produces images that generally look natural to the human eye because there is no significant expansion or contraction distorting the perspective. Special lenses—such as fish-eye lenses—can be used to generate images with very wide angles of view. Typically the perspective in these images will look distorted to the human observer. Some cameras may use multiple lenses, or a mechanism for moving a single lens between different imaging positions, to generate a wide angle image. Multiple camera images can be stitched together to form an image having a wider field of view that any of the lenses would be capable of generating individually. It is possible to stitch together enough images to create a 360° image.

Stitching together multiple overlapping images is typically a process that is done offline because of the time it takes to process the overlapping regions of the images to a high enough standard for the stitching to be undetectable by the human eye. This makes the systems that generate those images unsuitable for handling video images, which would require the stitching to be performed substantially in real time. Any real time stitching systems that do exist tend to be physically large and generate a lot of heat, which makes them unsuitable for being incorporated into cameras. Therefore, there is a need for a stitching system that offers improved hardware optimisation.

According to a first aspect, there is provided an apparatus for processing images that is capable of performing at least a first projection and a second projection on data representative of those images, the apparatus comprising a plurality of hardware blocks that are each configured to process data representative of the images in accordance with a mathematical function and at least one of said hardware blocks being configured to perform a mathematical function that forms part of both the first projection and the second projection, the apparatus being configured to use said hardware block when performing the first projection and when performing the second projection.

Other aspects may include one or more of the following:
The at least one hardware block may be configured to perform a mathematical function that forms part of a calculation of a direction vector according to the first projection and the second projection. The at least one hardware block may be configured to perform a trigonometric function. The at least one hardware block comprising a CORDIC circuit. The first and second projections being one or more of a Gall-Peters projection, an equirectangular projection, a rectilinear projection, and an equidistant fisheye projection.

According to a second aspect, there is provided a method comprising providing a hardware block that is configured to process data representative of images in accordance with a mathematical function that forms part of both a first projection and a second projection and using said hardware block when performing the first projection and when performing the second projection on the data representative of the images.

According to a third aspect, there is provided a memory manager configured to cause data to be stored in a memory, the memory manager being configured to apply a pairing function to an identifier associated with the data to thereby generate a unique number, and to cause the data to be stored in a memory location that is associated with that number.

Other aspects may include one or more of the following:
The memory manager may be configured to cause the data to be stored in sets, each of which is capable of storing more than one unit of data. The memory manager may be configured to associate more than one unique number generated via the pairing function with each set. The memory manager may be configured to, when new data is associated with a set that is already full, apply a data replacement algorithm to select which of the data already stored in the set to replace with the new data. The memory manager may be configured to apply a data replacement algorithm that includes one more of least recently used, first-in first-out and second chance. The memory manager may be configured to use a bijective pairing function to generate the unique number. The memory manager may be configured to use a Cantor pairing function to generate the unique number. The data may be image data and the memory manager is configured to apply the pairing function to a coordinate that identifies a location of the image data within an image.

The memory manager may be configured to apply a pairing function that generates unique numbers that can be represented by a bit sequence in which a group one or more bits at a particular position in that bit sequence will be different for first image data, which is at one location in the image, compared with a group of one or more bits in the same position of the bit sequence for second image data, which is at a second location in the image whereby the first and second image data are contiguous in the image.

The memory manager may be configured to store the unique numbers in a memory divided into sets. It may also be configured to select a set for storing a unique number in dependence on the group of one or more bits at the particular position in the bit sequence that represents that unique number. The memory manager may be configured to store unique numbers having different groups of one or more bits at the particular location in the bit sequence that represents them in different sets. The memory manager may be configured to store the unique numbers in sets that are independent of each other, such that unique numbers stored in different sets can be accessed simultaneously.

According to a fourth aspect, there is provided a method comprising applying a pairing function to an identifier associated with data to thereby generate a unique number and causing that data to be stored in a memory location that is associated with that number.

According to a fifth aspect, there is provided an apparatus for filtering multiple images so that they can be stitched together to form a blended image, the apparatus comprising a plurality of filters configured such that: (i) each filter is configured to process only images from the multiple images that will be non-overlapping with each other in the blended image; and (ii) images that will overlap with each other in the blended image are processed by different filters.

Other aspects may include one or more of the following:
Each filter may be configured to process its images from the multiple images in parallel with the others of the plurality of filters processing their images. Each filter may be configured to process its images from the multiple images in series with each other. Each filter is configured to process its images from the multiple images in an order that is dependent on an order in which those images will be stitched together to form the blended image. The filter may be configured to process its images in an order that is the same as an order in which those images will be stitched together to form the blended image.

The apparatus may comprise a summation unit that is configured to sum the processed images output by the filters. The summation unit may be configured to commence summing processed images output by the filters before all of the multiple images have been processed by the filters. The number of the plurality of filters may be lower than the number of the multiple images to be stitched together to form the blended image.

According to a sixth aspect, there is provided a method for filtering multiple images so that they can be stitched together to form a blended image comprising assigning each of the multiple images to one of a plurality of filters for processing such that: (i) each filter processes only images from the multiple images that will be non-overlapping with each other in the blended image; and (ii) images that will overlap with each other in the blended image are processed by different filters.

The present invention will now be described by way of example with reference to the accompanying drawings. In the drawings.

Figure 1:
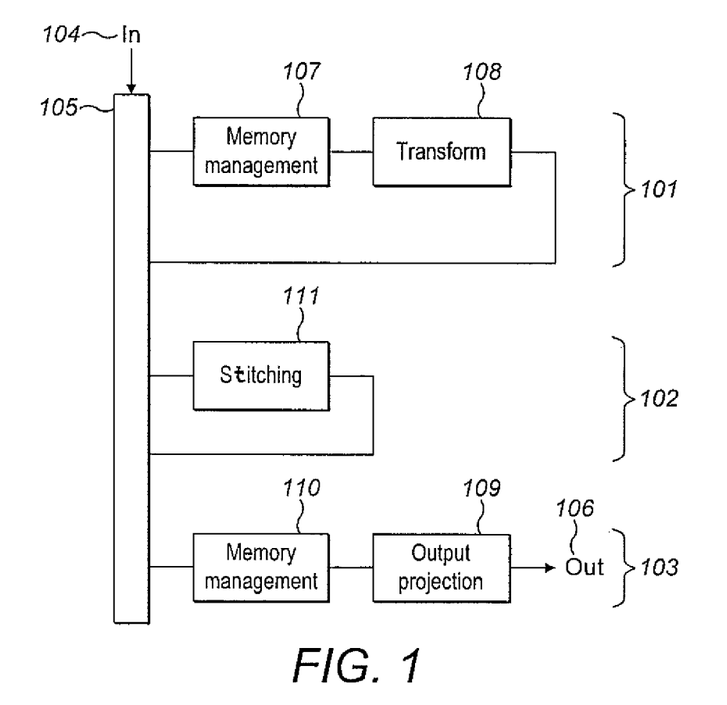
FIG. 1 shows an example of a processing pipeline.
Figure 2:
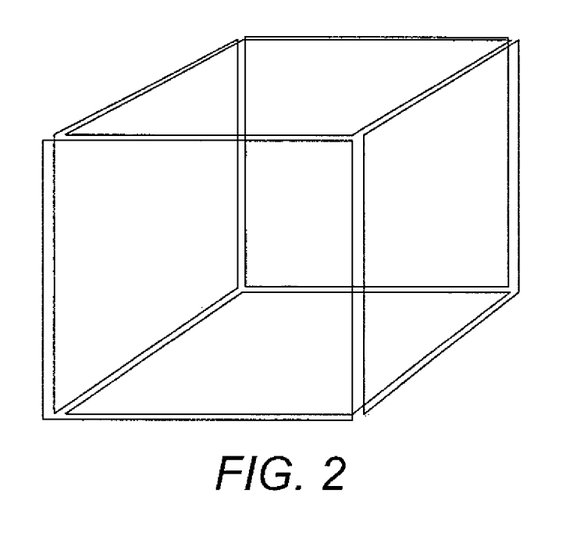
FIG. 2 shows an example of an arrangement of camera images.

A high-level example of an image processing pipeline for stitching together multiple images is shown in FIG. 1. The images could be any type of image, including camera images. The pipeline represents three key processes: transform 101 stitching 102 and output projection 103. The pipeline may be configured to receive multiple images 104 via a bus 105. In one example, the images may represent six photographs taken by six individual cameras. Each camera may represent one face of a cube. An example of such an image arrangement is shown in FIG. 2. In FIG. 2 the images are shown as non-overlapping for simplicity but it should be understood that the individual images could overlap or be arranged differently, and also that the number of images could be fewer or greater than six.

The incoming images are received via a bus 105. The purpose of the transform block 108 is to read the incoming frames and project from the image space into an intermediate projection space. This process tends to create random, but localised accesses on memory, which are handled by memory management block 107. The transform block may optionally be followed by a series of low pass filters (not shown) to generate a series of decimated images from each frame to be used by the stitching block 111.

The stitching block 111 may be configured to blend together individual images. This may be achieved using a multiband blend process. Each level of the process may blend together decimated representations of the original camera images. This process may be performed over multiple levels, with each successive level of the process blending representations that are progressively decimated with respect to the original camera images.

The output projection block 109 may be configured to transform the blended image into a selected output projection. This block also generates random accesses into memory and is provided with a memory management block 110. The memory management block 110 could be specific to the output projection block or shared with the transform block 108. The transform block may also share some mathematical function blocks with the output projection block 109.

The transform and output projection, stitching and memory management blocks are described in more detail below with reference to FIGS. 3 to 6.

Projection

Both the transform and output projection blocks shown in FIG. 1 involve transforming an image from one projection space into another. The transform block 108 receives the incoming frames and projects from the image space into an intermediate projection space. This is a projection that is used internally by the pipeline to combine the images. One option is to use a cube-map representation where the incoming images are projected into six separate image planes, one for each face of a cube. The stitching can then be performed on each face independently. In some implementations this cube map representation will coincide with the cameras also being arranged in a cube, but the same projection could be used for any arrangement of cameras. Equally any suitable projection could be used and the ideas described herein are not limited to cube mapping. Other suitable projections include sphere mapping projections, equal area projections such as Gall-Peters and rectilinear projections.

Figure 3A:
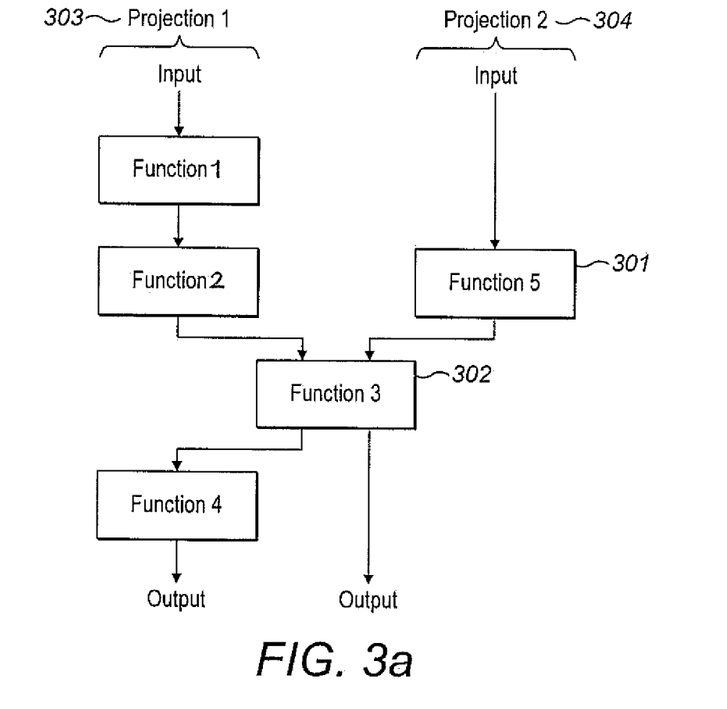
FIGS. 3a and b show an example of an arrangement of hardware blocks and a method for performing projections.

Each projection includes a number of different mathematical functions, some of which will be common to more than one projection. The image processing pipeline thus includes a number of hardware blocks that are each configured to process data representative of the camera images in accordance with a mathematical function. The pipeline is preferably configured to use a hardware block that is configured to perform a function that is shared by more than one projection when performing any of the projections in question. An example is shown in FIG. 3a: the pipeline comprises a plurality of different hardware blocks 301 that are each capable of performing a mathematical function, with hardware block 302 configured to perform a function that forms part of both the first projection 303 and the second projection 304. Combining parts of the projection pipelines in this way reduces the total number of hardware blocks, and thus reduces the size of the overall image processing pipeline.

Figure 3B:
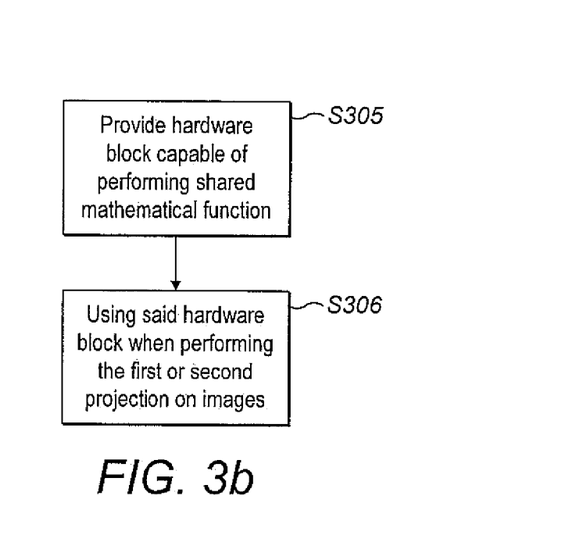

An example of a method for handling projection calculations is shown in FIG. 3b. The first step involves providing a hardware block (step S305) that is capable of performing at least one mathematical function that forms part of multiple projections. The second step involves using the shared hardware block when performing any of the multiple projections (step S306). Using a shared hardware block in this way may involve further considerations with respect to the image processing pipeline as a whole. For example, the pipeline is preferably configured to provide the shared hardware block with the inputs that it requires to process image data according to the different projections. The shared hardware block may thus be configured to receive different inputs, in dependence on which type of projection it is performing. In some instances, this may mean that the image processing pipeline is configured to perform the projections in a non-conventional way.

Stitching

Figure 4:
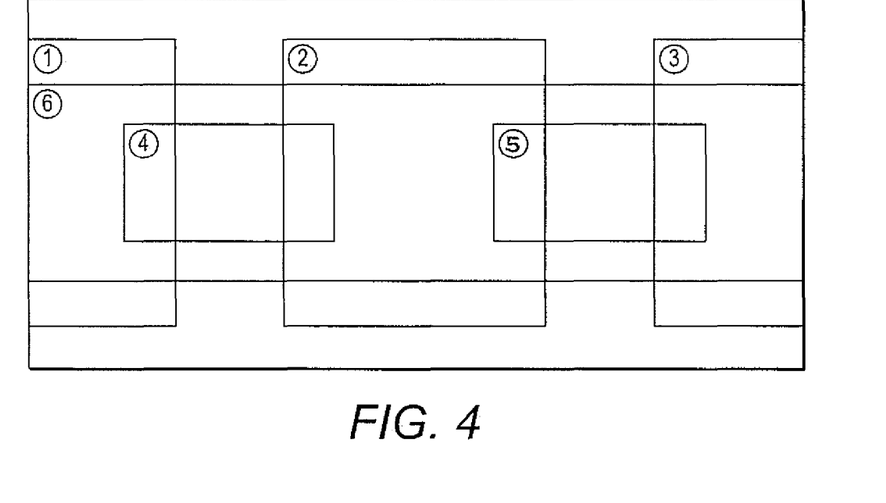
FIG. 4 shows an example of overlapping images.

To form blended versions of the original images will usually require the individual images (or their representations) to be overlapped with each other. An example is shown in FIG. 4, in which six images representing spherical content are overlapped to form a blended version that represents the original content as a two-dimensional panorama. Although the images are shown as being substantially rectangular in FIG. 4, this is for the purposes of example only. In practice the images are likely to have been distorted into arbitrary shapes by the initial projection to project the camera images onto the two-dimensional image plane.

The process of stitching the images together typically involves multiple levels of filtering, whether that is to generate decimated images or to expand decimated images.

The stitching block forms output pixels by summing together an expanded version of every image that overlaps at that point in the blended image. A straightforward implementation would be to have a stitching block with a number of expand filters equal to the number of images to be blended together so that the expanded images can be summed simultaneously. However, the process can be made more efficient in terms of hardware and/or time by dividing the incoming images into channels of non-overlapping images and allocating each channel to one expand filter. For example, in an example where six images are to be combined together into the blended image a straightforward implementation would have six expand filters, capable of generating six filtered images for being simultaneously summed together. However, in the blended image there may be no more than three overlapping images at any given point. This may be exploited to provide a stitching block with a reduced number of expand filters: a stitching block capable of expand and sum the maximum number of images that overlap at any given point in the blended image will suffice, provided the same filters are used repeatedly to process the images that do not overlap in the blended image (and hence are not summed together). Thus the number of expand filters in the six-image example may be reduced from six to three.

A practical illustration of this can be seen in FIG. 4. Images 1, 2 and 3 form a non-overlapping set of images. They can share a single channel and be allocated to the same filter, which then processes them in series. Similarly images 4 and 5 may share a second channel. Image 6 overlaps all the other images and so has a channel to itself. Thus the images that do overlap each other in the blended image form different channels and are allocated to different filters. They are processed in parallel with each other.

Figure 5A:
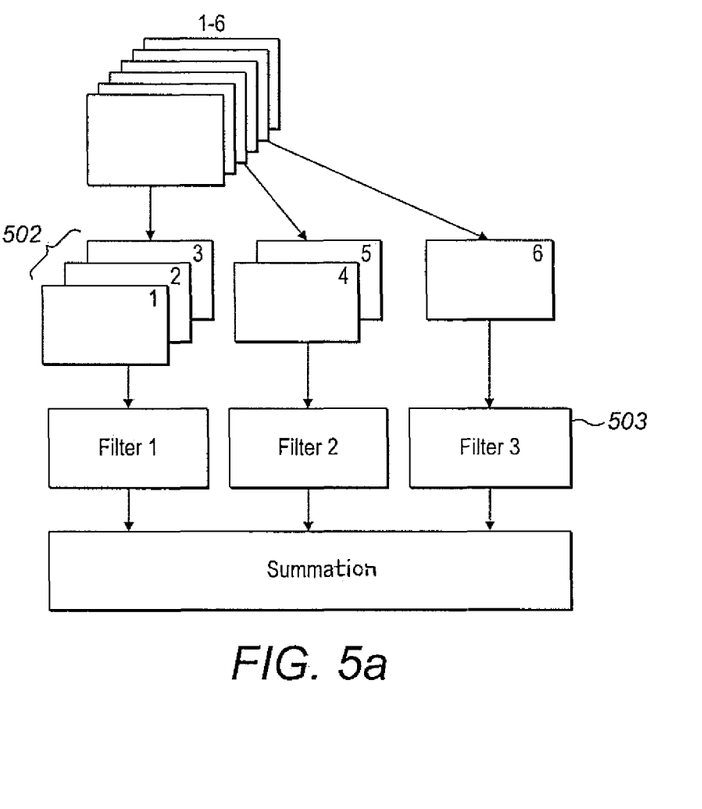
FIGS. 5a and b show an example of images being divided into two batches for filtering and a method of filtering.

An example of a stitching block is shown in FIG. 5a. It includes a plurality of filters 503 and a summation block 504. The multiple images to be stitched together are shown at 501. They are effectively divided into three channels 502 by being assigned to different ones of the filters. Each channel suitably streams its respective images consecutively so that each filter processes its allocated images in series. The order in which the images are filtered is preferably dictated by the order in which they are summed. The stitching block is suitably configured to proceed left-to-right across the frame, expanding and summing data from any channel that is providing valid input for that region of the frame. Referring to the example shown in FIG. 4, the summation block can commence summing images 1, 4 and 6 before images 2, 3 and 5 have been filtered because providing the summation block constructs the blended image in FIG. 4 from left to right nothing in the early stages of the summation will be affected by the absence of the filtered versions of images 2, 3 and 5.

Figure 5B:
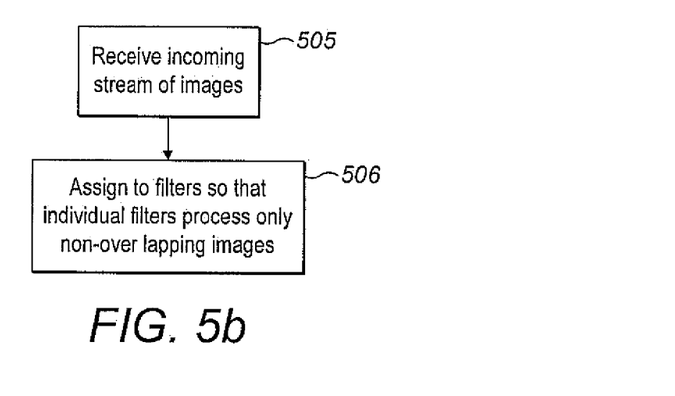

An example of a method for stitching together multiple camera images is shown in FIG. 5b. The method comprises receiving an incoming stream of images (step S505). This incoming stream of images is then assigned to individual ones of a plurality of filters (step 506). This allocation is done so that only non-overlapping images are assigned to a particular filter. Overlapping images are thus assigned to different filters.

The arrangement shown in FIGS. 5a and b may be particularly advantageous in systems that aim to process incoming images in real-time. Real-time processing requires the hardware to process the images as quickly as possible so much of the processing will be done in parallel. For example, the filter shown in FIG. 5a will commonly be a filter block comprising a number of filters arranged in parallel. The arrangement described above enables some of the filtering to be performed in series without reducing the overall speed of the system because the commencement of the summation operation is not held up. For example, in the arrangement of FIG. 5a, the number of individual filters within filter 504 could be reduced to four from six. In applications where speed is less of an issue, so that some of the filtering might previously have been performed in series, the arrangement described above could allow the stitching operation to be performed more quickly by arranging the images to be processed in an order that allows the summation block to start summing some of the filtered images before all of the images have been filtered.

Memory Management

The various operations performed by the image processing pipeline produce many accesses to memory. Memory bandwidth is at a premium, so it is important to optimise the process via which it is accessed. The memory manager shown at 107, 110 in FIG. 1 may be configured to handle memory accesses to a pixel store.

Figure 6A:
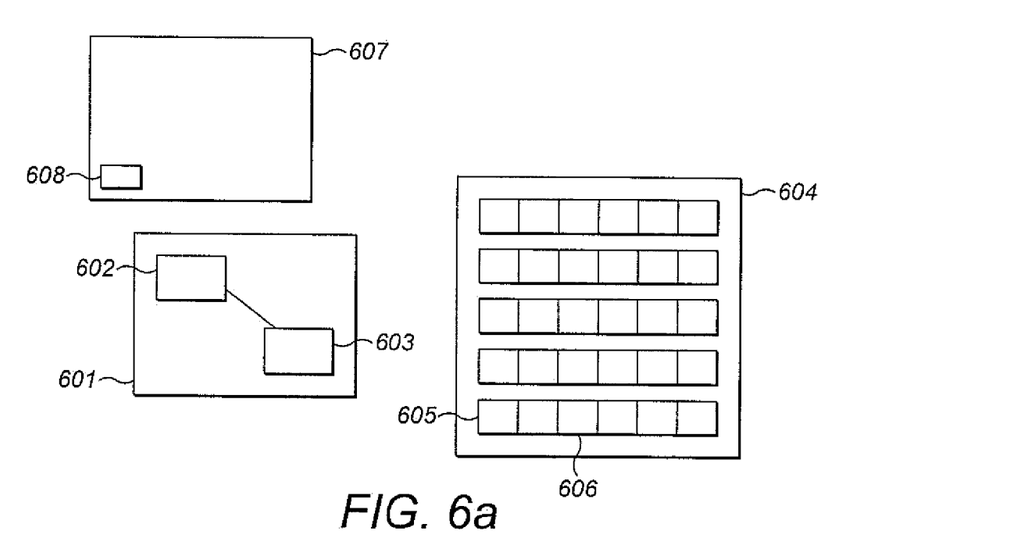
FIGS. 6a and b show an example of a memory manager and a method for managing a memory.

The memory manager is shown in more detail in FIG. 6a. The memory manager 601 comprises a memory mapping unit 602 and a storage unit 603. The memory mapping unit may use an identifier associated with image data 608 to generate a unique number that determines where the image data is stored in memory 604. The memory mapping unit may apply a pairing function to the identifier to generate the unique number. The pairing function may be any process for uniquely encoding two numbers into a single unique number. Simulations have shown that the Cantor pairing function offers particularly good performance. The storage unit is suitably configured to store the image data in a memory location that is associated with the unique number.

In one example, which is shown in FIG. 6, the memory is arranged in a series of sets 606, which are each configured to store multiple blocks of image data. Every unique number generated by the pairing function preferably maps to just one of the sets, although multiple unique numbers may map to each set. The memory manager is preferably configured to apply a suitable data replacement algorithm when a set is already full. Suitable examples include recently used, first-in first-out and second chance.

Figure 6B:
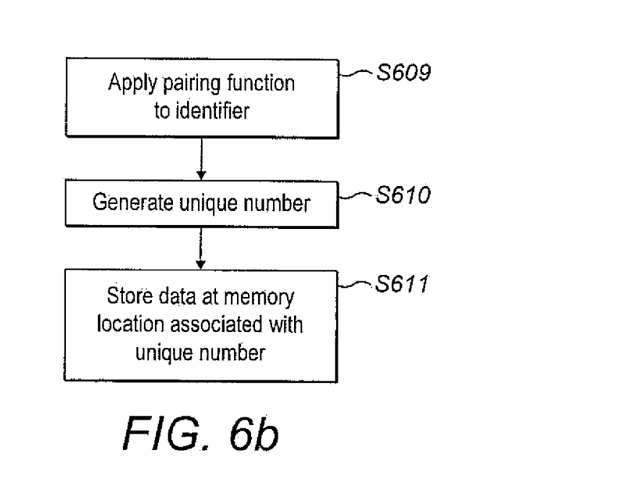

The memory manager shown in FIG. 6a might be used to store any type of data and is not restricted to storing image data. An example of a mechanism for storing any generic type of data is shown in FIG. 6b. In step S609, a pairing function is applied to an identifier associated with the data to be stored. This causes the generation of a unique number (step S610). The data is then stored at the location associated with the pairing function (S611).

The image data 608 may be a pixel and its identifier may be a coordinate that relates to its location within a larger image 607. Each pixel will typically be identified by a row-column coordinate associated with the particular image that the pixel is from.

Examples of an image processing pipeline will now be described in more detail with reference to a system that is configured to process multiple images at a time to produce spherical video content.

Figure 7:
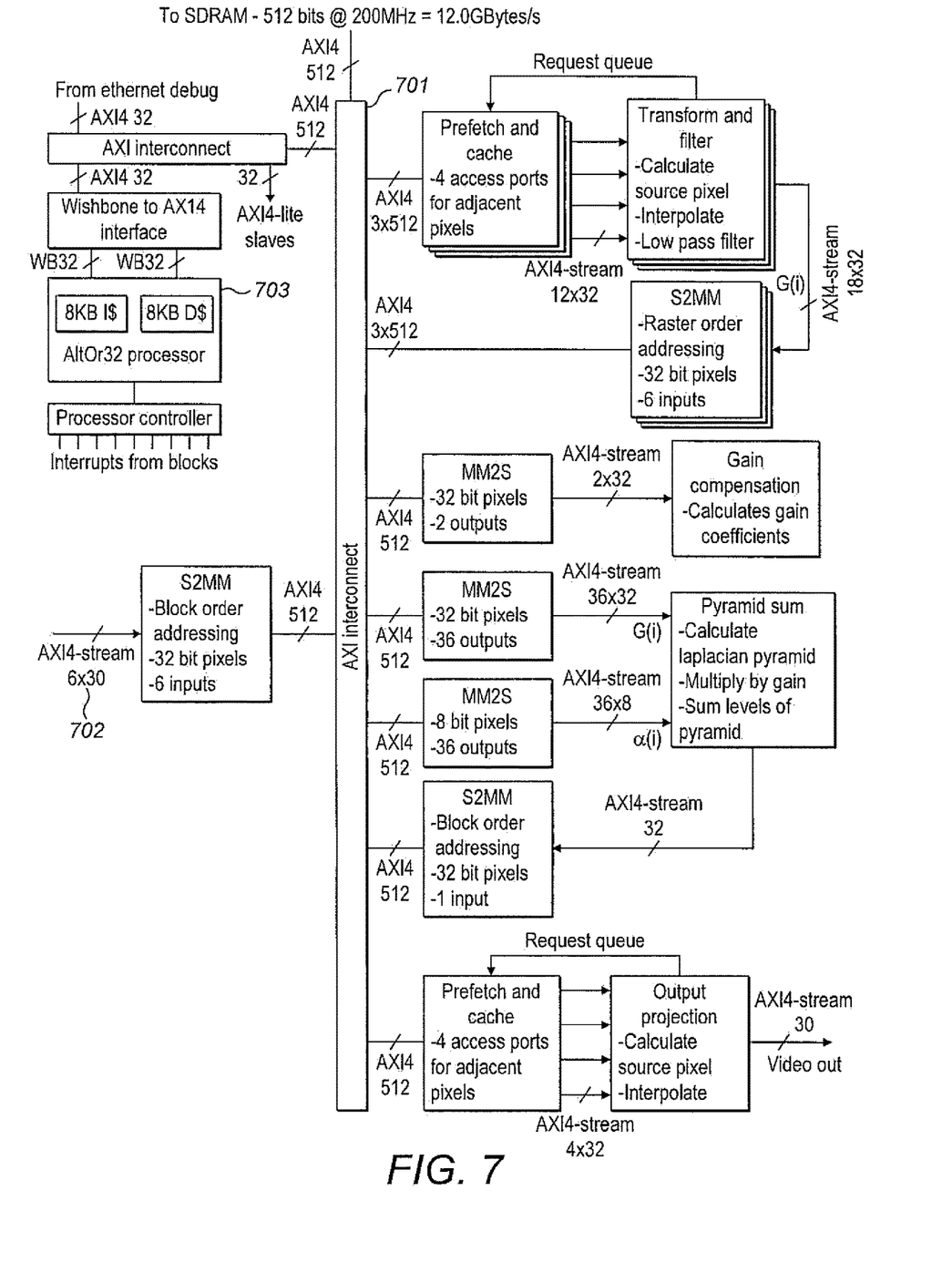
FIG. 7 shows an example of an image processing pipeline.

An example of the pipeline for this system is shown in FIG. 7.

The pipeline may be controlled by a processor 703. The pipeline is built around a bus 701, which forms the backbone of the system. The images enter the pipeline via input 702, which may be implemented as a streaming interface optimised for video. In the example of FIG. 7, input 702 includes six 30-bit video stream inputs for the camera images. All blocks may have access to smaller bus for register access and the ability to interrupt the processor if required.

The pipeline is set-up to handle six images for each video frame. These may be captured by six cameras, arranged so that each camera forms a different face of a cube. Each camera is arranged to capture an image at a predetermined frame rate. For example, each camera may produce a video output at 30 frames per second. Each camera preferably captures its respective images at the same size and resolution as the other cameras. A suitable size might be 1440×1080 pixels, for example. The cameras could equally produce images of different size and resolution from each other, but that may require some additional processing before they are stitched together.

The cameras may be synchronised or each camera may use its own clock. If the latter, the processor is responsible for synchronising the camera feeds. The time each frame is received may be recorded. The frames for each camera may be collected in a set of lists. For example, the processor could pop entries off the list to create a closest-to set. Thereafter for each frame, the top frame on each list may be taken and passed to the next stage as a synchronised set.

If the form of the current output requested by the user only uses part of the spherical content captured by the cameras, images captured by other cameras/parts of camera images may be dropped and not processed to reduce power consumption.

Transform and Filter

Figure 8:
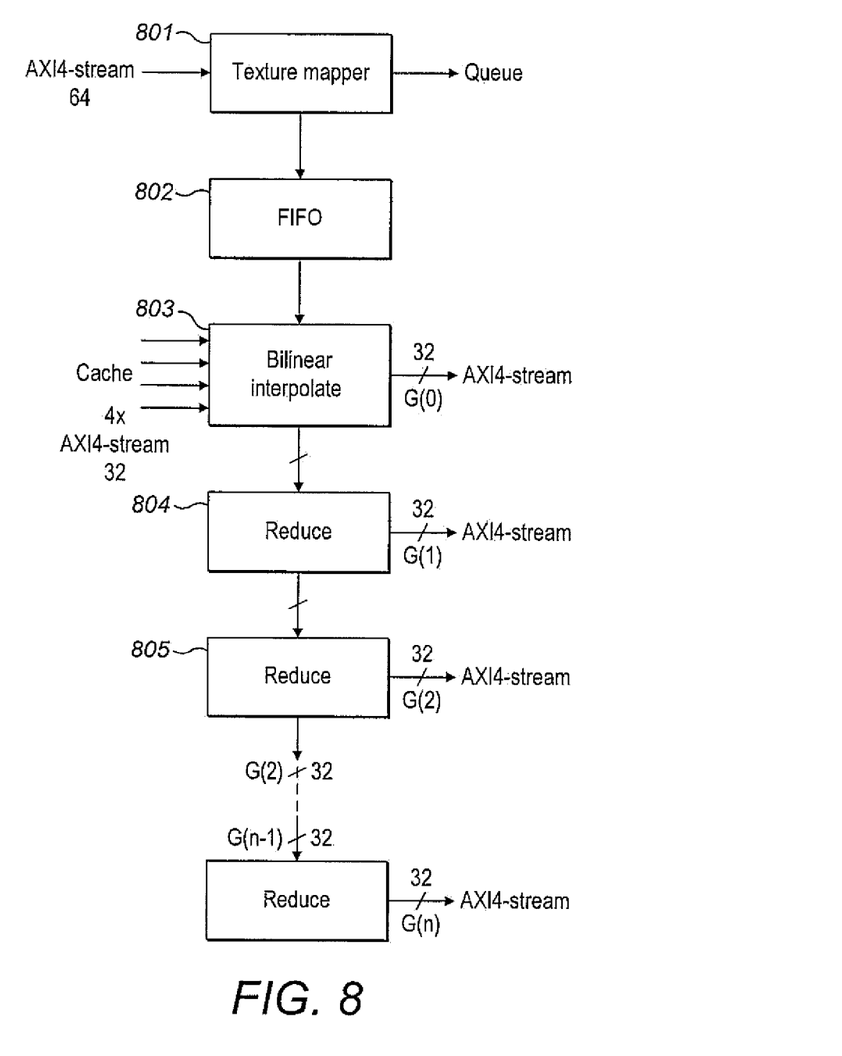
FIG. 8 shows an example of transform and filter block.

The transform and filter block serves two purposes. The first is to read the incoming frames and project from the image space into the two-dimensional image plane. The second is to create a set of low-pass filtered images for multiband blending. A block diagram showing the transform and filter block in more detail is shown in FIG. 8.

Figure 11:
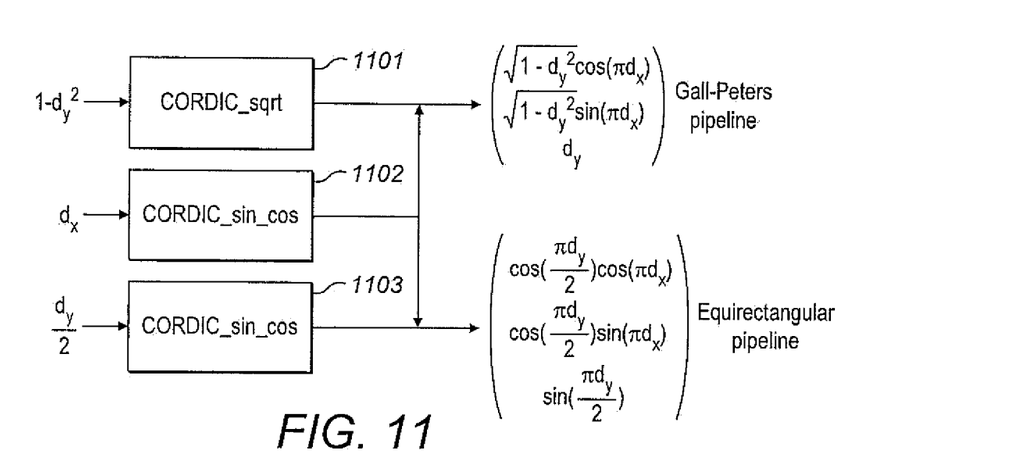
FIG. 11 shows an example of shared CORDIC blocks.

The incoming frames are initially processed by a texture mapper 801. The positions of the input pixels needed by the bilinear interpolation block 803 are sent to the cache, while the sub-pixel position information is read into buffer 802. Once the cache returns with the data, the interpolation can be performed using the sub-pixel position information. The projected pixels may be calculated using bilinear, Bicubic or Lancoz interpolation, or any other suitable interpolation technique. In the example of FIG. 11, bilinear interpolation is used (803).

Any suitable projection might be used internally to take the incoming camera frames from the projection imple- mented by the camera to the internal projection used by the image processing pipeline. If the cameras have curved lenses, for example, they may provide images that are already in the form of a fish eye projection with radial distortion. Any suitable projection might be used internally by the image processing pipeline. For example, the Gall-Peters projection has the advantage of preserving area but a rectilinear projection based on a cube map representation may offer better performance at the poles. The projection suitably scans through each frame and calculates the source position for each projected pixel with sub-pixel accuracy. This calculation typically only has to be performed once for a given arrangement of the cameras and internal projection type. Thereafter it can be streamed into the texture block from memory. It could be performed by the hardware of the pipeline itself or elsewhere, e.g. in processor 703 or in another processor, on start-up.

Any missing pixels are suitably marked in the pixel flags.

Figure 9:
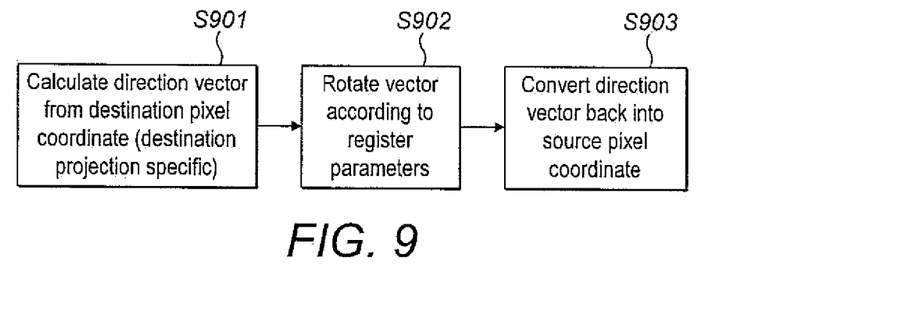
FIG. 9 shows an example of a projection calculation.

The projection may use some or all of the following information to calculate the source position for each output pixel in the final frame:

Bounding box and input frame dimensions
Bounding box and output frame dimensions
Projection type
Pan, tilt and zoom The calculation may comprise three main steps, as shown in FIG. 9: calculating direction vector from the destination pixel coordinate (S901), rotating that vector according to register parameters (S902) and converting the direction vector back into a source pixel coordinate (S904).

Pixel values surrounding the source position are read and interpolated to get the projected pixel value (e.g. the four surrounding pixels could be used). The projected pixels may be calculated using bilinear, Bicubic or Lancoz interpolation, or any other suitable interpolation technique. In the example of FIG. 8, bilinear interpolation is used (803).

The output of the "projection block" (i.e. the combination of the 2D counter and transform block and the interpolation block) is streamed to memory and also into a reduce filter block 804.

The reduce filter block forms one half of a mechanism to blend together the overlapping camera images to form a combined image. This mechanism involves successively reducing each of the camera images to generate a series of progressively decimated images. The second half of the mechanism involves summing together the images at each decimation level. In a sense, a pyramid of images is formed, with the images at each level of the pyramid representing the frames from different ones of the cameras reduced to the same level of decimation. The different camera images are then summed across each level of the pyramid. For more detail on this, see the section on pyramid sum.

In one example, each reduce filter performs a Gaussian filter. It also subsamples by a factor of 2. Thus the output is a quarter the size of the input. The filter is preferably separable so that it can be performed on columns and then on rows. This orientation can be helpful because the maximum size of a column is typically less than the maximum size of a row. Four lines of buffer may be required to store the intermediate column results.

The input to the reduce filter block is a transformed image, which may be arbitrarily shaped, so there will often be pixels around the edge of one image that might be missing from another image. The kernel may have 32 forms for different cases of missing pixels. If two or fewer pixels are present across the different images, the output pixel may be marked as missing. Missing pixels are identified by using the pixel flags. The output of each reduce filter 805 is streamed into memory and the next reduce filter 806 in the chain (if any). Intermediate filter results can require 16-bits of precision, so the line buffers may store 6 bytes per pixel.

To achieve the required throughput for real-time video, the image processing pipeline may include multiple ones of the filter chains shown in FIG. 8 arranged in parallel. In one example, each of the filters shown in FIG. 8 may output 200Mpixels/s. The total number of pixels to be processed for each frame of video data may be 14.75Mpixels. Thus, three filter chains run in parallel could be used to achieve the required throughput of 30 frames/s.

Gain Compensation

The exposure of each camera may be permitted to vary independently. The aim of gain compensation is to correct for this. One option is to find optimal coefficients, so that the luminance of each camera is as close as possible. One approach is to use a least squares approach.

$$S = \sum_{pairs} \sum_{overlapping\ pixels} (g_i L_{ij} - g_k L_{kj})^2 \quad (1)$$

This involves reading the pixel values in the overlapping regions, accumulating those values into a matrix and a vector and then solving the linear system. Luminance can be approximated by Luma in Rec. 709. The gain coefficient can then be multiplied by each RGB channels independently, since Luma is linear in RGB.

The memory bandwidth required by the gain compensation block can be reduced by applying it to the images at a different level of the pyramid.

Pyramid Sum

Figure 10:
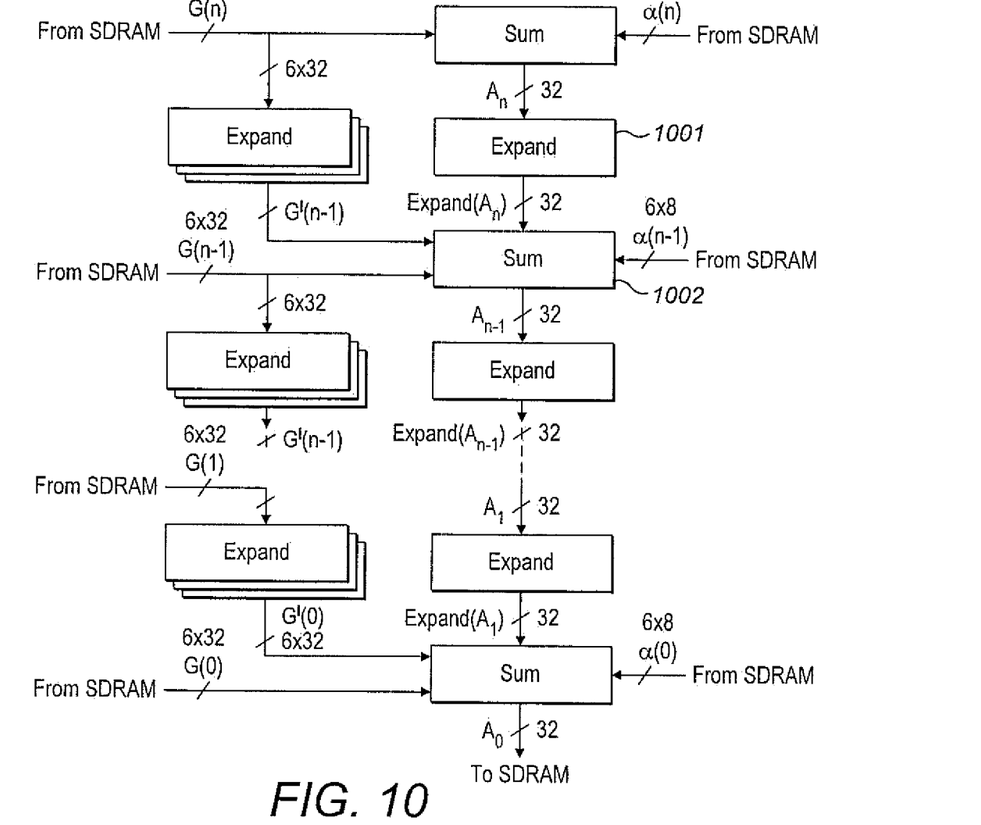
FIG. 10 shows an example of a pyramid sum block.

The pyramid sum block performs the "multiband blend" across the decimated images generated by the reduce filter block. This block outputs the fully blended frame. A block diagram is shown in FIG. 10.

In one example, each expand filter 1001 performs a Gaussian filter. It also upsamples by a factor of 2. Thus the output is 4 times the size of the input. Each expand filter is thus a match for its equivalent reduce filter in the reduce filter block. The filter is preferably separable so it can be performed on columns and then rows. Four lines of buffer may be required to store the intermediate column results.

Each level of the pyramid will typically include multiple expand filters arranged in parallel, as shown in FIG. 9. The number of expand filters that are needed can be reduced by channeling non-overlapping images to the same filter, as explained above. For example, for a six camera, cube arrangement the number of expand filters needed to process those six images at each level of the pyramid might be reduced from six to three.

The sum blocks 1002 perform the following calculation at level k in the pyramid:

$$A_k = \text{Expand}(A_{k+1}) + \sum_{Frame\ i} \sum_{Pixels\ j} g_i \alpha_{ij}(k)(G_{ij}(k) - \text{Expand}(G_{ij}(k+1))) \quad (2)$$

$g_i$ is the gain coefficient and $\alpha_i$ is the alpha mask for camera $G_i$.

The lowest level of the pyramid sum computes:

$$A_n = \sum_{Frame\ i} \sum_{Pixels\ j} g_i \alpha_{ij}(n) G_{ij}(n) \quad (3)$$

The sum blocks should also stream in the alpha masks for all 6 cameras.

When the input to this block is a transformed image there may be pixels around the edge of the image that are missing. The kernel has 32 forms for different cases of missing pixels; if two or fewer pixels are present the output pixel is marked as missing.

Missing pixels may be identified by a flag in the pixel.

The expand filter used for the $A_k$ frames can assume that all pixels are present. In this case the Gaussian kernel reduces to a simpler form. This means that only two lines of buffer are required.

This block can be extended to output mipmaps for each level. This may generate a one-third increase in write memory bandwidth.

Output Projection

This block takes the final blended image and performs the output projection. Suitable types of output projection include rectilinear, equidistant fisheye, full stitch Gall-Peters and full stitch equirectangular. The output projection block then outputs the frame over the DisplayPort interface. The block structure of the transform is suitably the same or similar to that of the transform and filter block.

In some implementations the image processing pipeline is able to perform more than one type of projection. The user may be able to select which one of the available types of output projection is used. The image processing pipeline is preferably configured to use mathematical formulations of the projections that overlap with each other in terms of the mathematical functions that they use. This can be explained with reference to the direction vectors listed in Table 1. It can be seen that three out of the four projections use a square root function and three out of four use either sine or cosine, or a combination of the two (e.g. cot). These mathematical functions can thus be shared between the different projections, meaning that a single hardware block can be shared between pipelines for calculating different projections. An example is shown in FIG. 11.

TABLE 1

| Destination projection | Direction vector $\underline{v}_d$ |
|---|---|
| Gall-Peters | $\begin{pmatrix} \sqrt{1-d_y^2}\cos(\pi d_x) \\ \sqrt{1-d_y^2}\sin(\pi d_x) \\ d_y \end{pmatrix}$ |
| Equirectangular | $\begin{pmatrix} \cos\left(\dfrac{\pi d_y}{2}\right)\cos(\pi d_x) \\ \cos\left(\dfrac{\pi d_y}{2}\right)\sin(\pi d_x) \\ \sin\left(\dfrac{\pi d_y}{2}\right) \end{pmatrix}$ |
| Rectilinear | $\begin{pmatrix} d_x \\ d_y \\ 1 \end{pmatrix}$ |
| Equidistant fisheye | $\begin{pmatrix} d_x \\ d_y \\ \sqrt{d_x^2+d_y^2}\cot\sqrt{d_x^2+d_y^2} \end{pmatrix}$ |

TABLE 1-continued

| Destination projection | Direction vector $\underline{v}_d$ |
| --- | --- |

In the table, given a destination pixel position of (X,Y)

$$d_x = \frac{(X - C_X^d)}{f_X^d} \quad (4)$$

$$d_y = \frac{(Y - C_Y^d)}{f_Y^d} \quad (5)$$

FIG. 11 shows three hardware blocks: two that are configured to perform trigonometric functions (1102, 1103) and one that is configured to perform square root (1101). The blocks in FIG. 11 are CORDIC blocks, but any suitable hardware could be used. The hardware blocks in FIG. 11 are shared between two pipelines: one for performing a Gall-Peters projection and the other for performing an equirectangular projection. Each projection pipeline is configured to provide the shared blocks with the appropriate inputs for calculating its specific projection; thus each projection pipeline is likely to provide the shared blocks with different inputs. The shared blocks may be shared between different types of output projections but also between the output projection block and the projection part of the transform and filter block.

The output projection block should transpose rows and columns in order to undo the transpose performed by the transform and filter block.

Each projection tends to over simple the final blended image, so the lower mipmaps of the pyramid may not be needed. Another option, if it is desired to output at a resolution that is lower than the top level of the pyramid, would be to use the mipmaps with a cubic interpolation method.

The block may be configured to always output the same shape of frame, e.g. a 3840×1920 frame, and to add black bars where appropriate if the number of pixels output by the projection block does not fill the frame.

Prefetch and Cache Both of the transform blocks require a cache since they produce random accesses into memory. Although the accesses are random, they are still somewhat localised so it makes sense to cache blocks of pixels.

Pixels from the images may be stored in 4 bytes, e.g. 10 bits R, 10 bits G, 10 bits B and 2 bits for flags. The flags can be used to mark if pixels are missing. Cached blocks of pixels may be 8×8 pixels in size. Each pixel block would thus be 256 bytes in size.

The cache may store 1024 blocks. Frames which are going to be accessed using a cache may be stored using a different addressing scheme to standard frames. In this scheme the first 8×4096 block is written contiguously to memory, then the next 8×4096 size block and so on. This ensures that 8×8 blocks are stored in contiguous memory. This would allow two full rows of pixels to be stored in the cache.

Memory bandwidth is typically at a premium, so any optimisation in this area may lead to increased resolution, increased frame rate, increase in bit depth, decrease in power or any combination of these.

The cache is suitably split into two halves: prefetch and the cache itself. In this scenario, the functional block that is using the cache generates its list of requested pixels twice.

The first list is streamed into the prefetch. The second list may be used by the pipeline to determine which pixels will be streamed out of the cache later, when the "prefetched" image data comes to be requested. For every required pixel block, it may be necessary to determine whether that pixel block is in the cache by looking up a tag associated with that block in the prefetch. The prefetch can then be considered a "tag store".

The mapping of pixels to the cache may be managed by a function p(x, y) that maps an identifier associated with the image data to a location in the cache. Suitably this function maps each block of pixels to a set within the cache. For example, the cache may be capable of storing 2m blocks of 8×8 pixels. Those pixel blocks may be arranged into sets of size 2n. Function p(x, y) maps a block to a set. The function is suitably a pairing function: $f: N \times N \rightarrow N$. It is also suitably a bijective function: each element in one set is paired with exactly one element in the other set and vice versa.

One consequence of the one-to-one mapping of a pairing function is that the unique numbers generated by the mapping tend to quickly become very large. A certain number of bits of this unique number may be selected to represent the set to which particular pixel block should be mapped. For example, a set may be selected by taking the bottom 10−n bits of the output of the pairing function. Thus while the output of the pairing function may itself be a unique number, in practice multiple pixel blocks will tend to be mapped to one set. The cache may thus be set-associative.

Any suitable pairing function could be used to map pixel blocks to cache sets. Simulations have been run to compare the memory bandwidth required by different pairing functions. One function that was found to perform well is the Cantor pairing function:

$$C(x,y)=\tfrac{1}{2}(x+y)(x+y+1)+y \quad (6)$$

Where x and y represent an identifier associated with the pixel block, e.g. its block row and block column number within a respective image.

Another function that has been found to perform well is the following:

$$n(x,y)=[\tfrac{1}{2}(x/2+y/4)(x/2+y/4+1)+y/4]$$

$$p(x,y)=8[n\hat{\ }(n>>7)]+2(y\text{"mod"}4)\pm x\text{"mod"}2 \quad (7)$$

Where x and y again represent an identifier associated with the pixel block and >> represents the arithmetic shift right operator. The exact number of bits that are shifted may vary depending on the exact arrangement of the prefetch, as will become apparent from the description below.

The prefetch may be split into multiple independently operating stores, with each store being responsible for a subset of the pixel blocks. Suitably the prefetch is configured in such a way that adjacent pixel blocks do not belong to the same store. This enables tags for contiguous regions of pixel blocks to be processed simultaneously. For example, the prefetch may be split into 8 independently operating tag stores, with each store responsible for a subset of the tags in such a way that adjacent blocks never belong to the same store. This can be achieved using the pairing in equation (7) above: the bottom 7 bits of p can be used to determine the cache set; the top 13 bits of p can then be used to determine the cache member. This can be expressed as follows:

cache_set[6:0]=p[6:0]

cache_member[12:0]=p[7+:13]

Because of the definition of the pairing function in equation (7), all the pixel blocks in a 2×4 region are guaranteed to differ in the least three significant bits of the cache set. These bits determine which of the 8 stores is to be used. Each tag store uses the remaining 4 bits of the cache set to determine which of its 16 tag entries to look up. This gives the following layout of a tag entry:

tag[TAG_WIDTH−1:0] = {$C$[3:0], $E$[0]

$M\_15$[12:0].

$M\_14$[12:0].

$M\_13$[12:0].

...

$M\_0$[12:0]}

Each tag entry records the details of 16 pixel blocks stored in the cache. The member bits (M) of the pairing function for each block in the set are stored in the tag. Since the pairing function is bijective it suffices to compare its cache_member to the members stored in the tag to determine if a block is in the cache. The E bit determines if the tag is full, ie. all slots are occupied. The C value is an index into the block indicating which slot to fill next.

The tag store may determine if a cache hits a slot by calculating:

$$\text{cache\_hit}[i] = p == M\_i \&\& (E \| c > i)$$

This can be more generally expressed as follows. Essentially the pairing function in equation (7) is an example of a pairing function that generates unique numbers. Those unique numbers can be expressed as a bit sequence, and at a particular position in that bit sequence there will be a group of one or more bits that will be different for pixel blocks that neighbour each other in a group of pixel blocks that form a contiguous section of the image. In the example above, those bits are the three least significant, but they could be at any position. The unique numbers, or tags, are then stored in one of the multiple independent "stores" in the prefetch in dependence on their respective group of one or more hits. Suitably that results in the tags for neighbouring groups of pixel blocks being stored in separate stores, so that they can be accessed simultaneously.

If the block hits the cache, the tag does not need to be updated. However, if the block misses the cache then a request for the block is suitably pushed into the memory requester. The memory requester may be implemented as a FIFO (First In First Out) buffer. The tag can then be updated in the following way:
1. Update p for the block indexed by C.
2. If the value of C is 15, set the E bit.
3. Increment C When the cache is flushed, the values of C and E are suitably set to 0.

After all 8 pixel blocks of the 2×4 region have been checked against the tag store, an entry is suitably made in the command FIFO so that the cache knows which pixels to output. For every block that misses the cache, an entry is made in the memory requester FIFO. These entries are read by the memory requester and fetched from memory. The entries are written into the memory requester FIFO in top-left, top-right, bottom-left, bottom-right order. If the memory requester FIFO or the command FIFO is full, then the prefetch suitably waits for a space in both FIFOs.

Other options for improving performance include increasing the locality of the accesses and increasing the size of the cache. For example, increasing the locality of the cache can be introduced by having consumers of the cache request a pixel as part of a larger group of pixels that neighbour each other in their respective image. For example, the consumers may have to request every pixel as a 4 pixel×4 pixel tile.

The cache may also employ an algorithm to select which pixel block to evict when a set is full. Some options include:
  Least recently used (LIEU): replace the block which has been referenced least recently.
  First In First Out FIFO: push new blocks into a FIFO buffer. Once this is full, replace the block at the front of the FIFO.
  Second Chance: As FIFO, but the tag for each block has a bit which is set to 1 on each reference. If the block at the front of the FIFO has this bit set to one, then it is pushed into the back of the FIFO with the bit set to 0. This is repeated until a block with the bit set to 0 is found and this block is then evicted.

Simulations have found that 4×4 tiles, a FIFO replacement algorithm and a cache size of 1024 pixel blocks perform particular well when combined with the Cantor pairing function or the pairing function defined in equation (7). The pairing function defined in equation (7) may also provide a particular advantage in that it allows the tags for a 2×4 region of pixel blocks to be requested simultaneously, allowing the cache to check tags more rapidly.

The structures shown in the figures herein are intended to correspond to a number of functional blocks in an apparatus. This is for illustrative purposes only. The figures are not intended to define a strict division between different parts of hardware on a chip or between different programs, procedures or functions in software. In many embodiments, some or all of the procedures described herein are likely to be performed predominantly in hardware. For example, any or all of the functional blocks comprised in the image processing pipeline described above might be implemented on an integrated circuit, including an appropriately configured application specific integrated circuit (ASIC) or a field-programmable gate array (FPGA). In some implementations, some or all of the procedures described herein may be implemented by a processor acting under software control. Any such software is preferably stored on a non-transient computer readable medium, such as a memory (RAM, cache, FLASH, ROM, hard disk etc.) or other storage means (USB stick, FLASH, ROM, CD, disk etc). Any of the functional units described herein might be implemented as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus for filtering multiple images so that they can be stitched together to form a blended image, the apparatus comprising a plurality of filters, wherein:
  the multiple images comprise two or more first images, and one or more second images;

the two or more first images do not overlap with each other in the blended image;
the one or more second images overlap with one or more of the two or more first images in the blended image;
the plurality of filters comprise a first filter and a second filter;
the second filter is different from the first filter;
the first filter is configured to process the two or more first images;
the second filter is configured to process the one or more second images,
wherein the first filter is configured to process all images within the multiple images that do not overlap with each other in the blended image, and the rest of the plurality of filters are prevented from processing any of the all images within the multiple images that do not overlap with each other in the blended image.

2. The apparatus as claimed in claim 1, wherein the first filter and the second filter are configured to process the following, in parallel: the first filter for processing at least one of the two or more first images; and the second filter for processing at least one of the one or more second images.

3. The apparatus as claimed in claim 2, wherein the first filter is configured to process the two or more first images in series.

4. The apparatus as claimed in claim 3, wherein each filter of the first and second filters is configured to process its images from the multiple images in an order that is dependent on an order in which those images are to be stitched together to form the blended image.

5. The apparatus as claimed in claim 4, wherein the filter is configured to process its images in an order that is the same as an order in which those images are to be stitched together to form the blended image.

6. The apparatus as claimed in claim 1, comprising a summation unit that is configured to sum the processed two or more first images and the processed one or more second images output by the first and second filters.

7. The apparatus as claimed in claim 6, wherein the summation unit is configured to commence summing processed images output by the plurality of filters before all of the multiple images have been processed by the plurality of filters.

8. The apparatus as claimed in claim 1, wherein the number of the plurality of filters is lower than the number of the multiple images to be stitched together to form the blended image.

9. The apparatus as claimed in claim 1, comprising a summation unit that is configured to sum (a) at least one of the two or more first images processed by the first filter and (b) at least one of the one or more second images processed by the second filter, before all of the two or more first images and the one or more second images are processed by the first and second filters, respectively.

10. The apparatus as claimed in claim 1, wherein:
the one or more second images do not overlap with each other in the blended image;
the first filter is prevented from processing the one or more second images; and
the second filter is prevented from processing the two or more first images.

11. The apparatus as claimed in claim 1, wherein:
the multiple images comprises one or more third images;
the one or more third images overlap, in the blended image, with one or more of the two or more first images and one or more of the one or more second images;
the plurality of filters comprise a third filter that is different from the first and second filters; and
the third filter is configured to process the one or more third images.

12. A method for filtering multiple images so that they can be stitched together to form a blended image, wherein the multiple images comprise two or more first images, and one or more second images,
wherein the method comprises:
assigning the two or more first images to a first filter of a plurality of filters;
assigning the one or more second images to a second filter of the plurality of filters;
processing the two or more first images by the first filter;
processing the one or more second images by the second filter, wherein:
the two or more first images do not overlap with each other in the blended image;
the one or more second images overlap with one or more of the two or more first images in the blended image;
the second filter is different from the first filter; and
the first filter is configured to process all images within the multiple images that do not overlap with each other in the blended image; and
preventing the rest of the plurality of filters from processing any of the all images within the multiple images that do not overlap with each other in the blended image.

13. The method of claim 12, wherein the first filter and the second filter process the following in parallel: the first filter processing at least one of the two or more first images; and the second filter processing at least one of the one or more second images.

14. The method of claim 12, wherein the first filter processes the two or more first images in series.

15. The method of claim 14, wherein the two or more first images and the one or more second images assigned to the respective filters of the plurality of filters are processed in an order that is dependent on an order in which the two or more first images and the one or more second images are to be stitched together to form the blended image.

16. The method of claim 15, wherein the order is the same as an order in which the two or more first images and the one or more second images are to be stitched together to form the blended image.

17. The method of claim 12, further comprising: summing the processed two or more first images and the processed one or more second images output by the first and second filters of the plurality of filters.

18. The method of claim 12, comprising: summing processed images output by the plurality of filters before all of the multiple images have been processed by the plurality of filters.

19. The method of claim 12, wherein the number of the plurality of filters is lower than the number of the multiple images that are to be stitched together to form the blended image.

* * * * *